(12) United States Patent
Gregaard et al.

(10) Patent No.: US 7,132,611 B2
(45) Date of Patent: Nov. 7, 2006

(54) APPARATUS FOR THE REGISTRATION OF WEIGHT

(75) Inventors: Morten Gregaard, Knebel (DK); Paul Erik Skifter, Knebel (DK); Carsten Simonsen, Knebel (DK)

(73) Assignee: Capamo ApS, Aarhus (DK)

( * ) Notice: Subject to any disclaimer, the term of this patent is extended or adjusted under 35 U.S.C. 154(b) by 0 days.

(21) Appl. No.: 10/519,302

(22) PCT Filed: Jun. 20, 2003

(86) PCT No.: PCT/DK03/00410

§ 371 (c)(1),
(2), (4) Date: Jan. 25, 2005

(87) PCT Pub. No.: WO2004/006660

PCT Pub. Date: Jan. 22, 2004

(65) Prior Publication Data

US 2005/0173161 A1    Aug. 11, 2005

(30) Foreign Application Priority Data

Jun. 26, 2002   (DK) ............................... 2002 00984

(51) Int. Cl.
| | |
|---|---|
| G01G 19/00 | (2006.01) |
| G01G 17/08 | (2006.01) |
| G01G 9/00 | (2006.01) |
| G01N 27/22 | (2006.01) |
| G01R 27/26 | (2006.01) |

(52) U.S. Cl. .................. 177/210 C; 119/518; 119/521; 119/51.02; 119/75; 600/372; 600/547; 340/5.82

(58) Field of Classification Search ................ 600/372, 600/547; 340/5.82; 177/210 C; 119/518, 119/521, 51.02, 75

See application file for complete search history.

(56) References Cited

U.S. PATENT DOCUMENTS

| | | | | |
|---|---|---|---|---|
| 3,639,905 | A | * | 2/1972 | Yaida et al. ................ 340/5.82 |
| 3,679,875 | A | * | 7/1972 | Rawson et al. ............. 235/375 |
| 3,788,276 | A | * | 1/1974 | Propst et al. ................ 119/174 |
| 4,048,986 | A | * | 9/1977 | Ott ............................... 600/407 |
| 4,223,751 | A | * | 9/1980 | Ayers et al. ............ 177/210 C |
| 4,461,241 | A | * | 7/1984 | Ostler ...................... 119/51.02 |
| 4,463,706 | A | * | 8/1984 | Meister et al. ........... 119/51.02 |
| 4,617,876 | A | * | 10/1986 | Hayes ......................... 119/842 |
| 4,798,175 | A | * | 1/1989 | Townsend et al. ....... 340/572.7 |

(Continued)

FOREIGN PATENT DOCUMENTS

DE        4446346        6/1996

(Continued)

*Primary Examiner*—Randy W. Gibson
(74) *Attorney, Agent, or Firm*—James Creighton Wray

(57) ABSTRACT

The present invention concerns an apparatus for registering weight and/or water content of fit and sick individuals, where the apparatus includes a weighing cell including at least two electric conducting plates on which is applied a voltage from a power supply, and that the at least two electric conducting plates are disposed with mutually opposite faces and with adjustable spacing, so that an individual or a well-defined part of the individual may be placed between the at least two electric conducting plates. and a measuring unit including means for registering the change in capacity between the at least two electric conducting plates and means for converting the capacity change into a numerical number which is correlated with the weight and/or the water content of the individual.

11 Claims, 4 Drawing Sheets

U.S. PATENT DOCUMENTS

Figure 1:
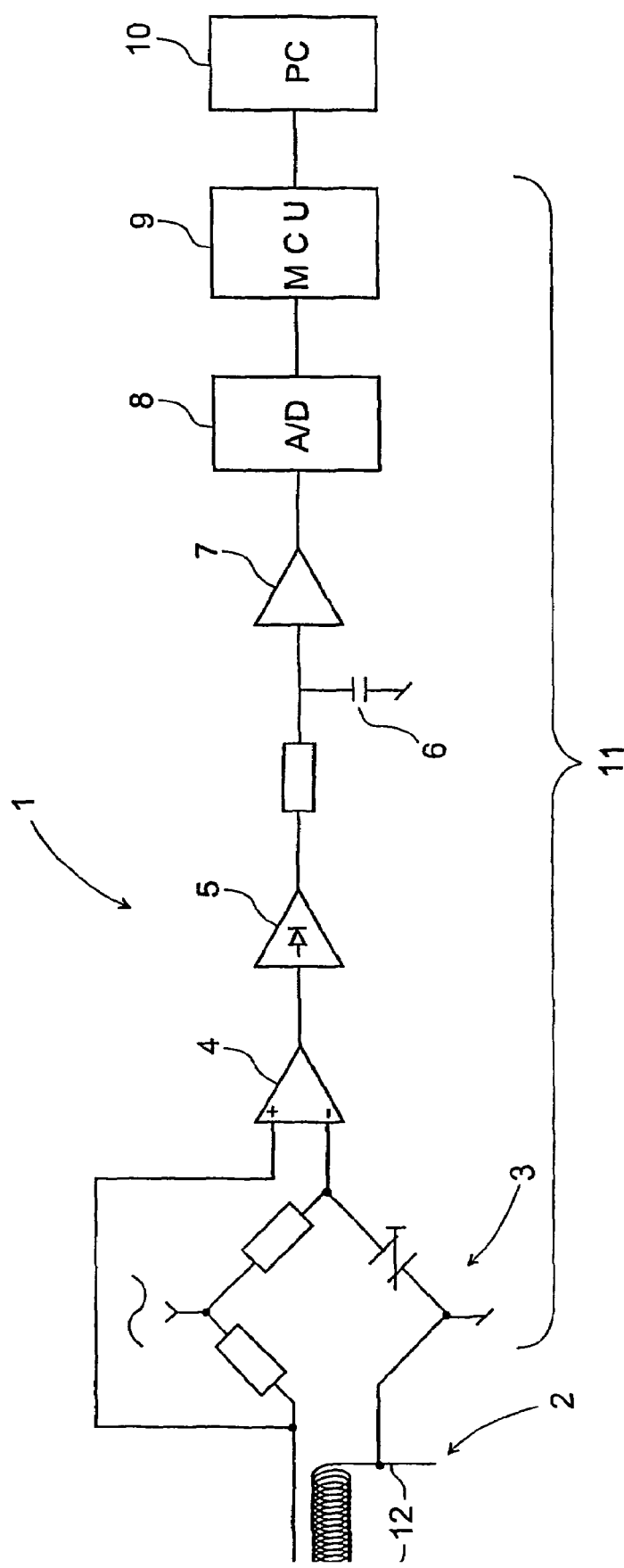

| | | | |
|---|---|---|---|
| 5,143,079 A * | 9/1992 | Frei et al. | 600/547 |
| 5,602,485 A * | 2/1997 | Mayer et al. | 324/663 |
| 5,810,742 A * | 9/1998 | Pearlman | 600/547 |
| 6,038,465 A * | 3/2000 | Melton, Jr. | 600/407 |
| 6,088,615 A * | 7/2000 | Masuo | 600/547 |
| 6,308,096 B1 * | 10/2001 | Masuo | 600/547 |
| 6,490,481 B1 * | 12/2002 | Komatsu et al. | 600/547 |
| 6,497,197 B1 * | 12/2002 | Huisma | 119/75 |
| 6,850,798 B1 * | 2/2005 | Morgan et al. | 600/547 |
| 6,898,299 B1 * | 5/2005 | Brooks | 382/115 |

FOREIGN PATENT DOCUMENTS

| | | | |
|---|---|---|---|
| EP | 1091215 | 4/2001 | |
| GB | 2190574 A * | 11/1987 | 119/51.02 |
| NL | NE 8700499 | 9/1988 | |
| WO | WO 98/47351 | 10/1998 | |

\* cited by examiner

APPARATUS FOR THE REGISTRATION OF WEIGHT

This application claims the benefit of Danish Application No. PA 2002-00984 filed Jun. 26, 2002 and PCT/DK2003/000410 filed Jun. 20, 2003.

FIELD OF THE INVENTION

The present invention concerns an apparatus for registering weight and/or water content in fit and sick individuals.

BACKGROUND OF THE INVENTION

The basic idea behind the invention comes from the agricultural sector where disadvantages have been found by the existing methods for weight determination of individuals on different stages of the growth period.

Subsequently, in the period of development, other areas of application have been found, as e.g. the health sector, where there are drawbacks by the existing methods for water content determination of individuals on different stages of a period of sickness.

In the agricultural sector, it is important for the farmers raising animals for slaughter to get the greatest possible growth rate from the amount of feed used simultaneously with providing for the environment by e.g. reducing the discharge of nitrogen.

Experience shows that the optimal feeding of the single animal for growing as fast as possible without achieving an undesirable large fat percentage is to provide it with feed with a content of energy and protein suitable for the growth stage of the animal during the growth period.

The feed may e.g. contain different amounts of grain, proteins, vitamins, minerals and/or drugs.

It will be optimal that the farmer keeps a close eye on the weight of the animal, so that the ratio between the feed grade/protein level, and the growth of the animal is registered whereby the composition and feed amount may be adjusted.

In order to achieve maximum optimisation in growth of an animal in its entire growth period, it is necessary that the animal is weighed at least once a day, and that this measurement is compared with the dispensed amount of feed and feed grade and protein level.

For weighing loose animals, there are used types of weighing apparatuses that are typically designed with a plate on weigh cells and a cage for keeping the animal on the plate during weighing.

A number of weighing systems are described in patent publications as WO 01/17340, WO 98/47351, U.S. Pat. No. 5,579,719 and GB 2,220,834 that may identify an animal walking on a weight and where the result is used for special feeding of single individuals.

The problem with the above types of weights is that they are very expensive and the weight installation requires some space and some maintenance as they are continually placed in an aggressive stable environment.

There is described an apparatus in DE-A1-44 32 849 where the mass of an item may be determined. The drawback of this apparatus is that its system of a measuring cell and a coil in a oscillatory circuit cannot be used for measuring conducting items, as e.g. living individuals, as the oscillator of the apparatus will stop oscillating if an electric conducting item passes the measuring cell.

In the health sector it is important to register the water content of a patient for e.g. diagnosis at dehydration of the patient or by accumulation of water in the patient's body, so that a real treatment of the patient may be performed.

Today, diagnosis occurs on the basis of the symptoms displayed by the patient, which is at a time where the patient has advanced into the period of sickness.

Therefore, it would be optimal if it was possible at an early time in the period of sickness to perform a sure diagnosis forming basis of a treatment, and subsequently check this diagnosis at regular time intervals by means of a registration apparatus.

DE-A1-44 46 346 describes an apparatus, which makes it possible to measure the change in body part electrolyte volume, which body part is positioned between two capacitor plates.

The disadvantage of the apparatus according to DE-A1-44 46 346 is that the measurement of the electrolyte volume change only concerns the body part volume and not the body part weight.

According to DE-A1-44 46 346 the resonant frequency is preferably described in MHz range. This is, however, a disadvantage as frequencies in MHz range causes the capacitor plates to act as an antenna, and it is impossible to measure any electrolyte volume change.

Furthermore, high resonant frequency demands smaller capacitor plates and a small distance between the capacitor plates for functioning. This only allows measurement of a small electrolyte volume; hence the apparatus does not apply to large body parts or entire animals, e.g. pigs.

Figure 2:
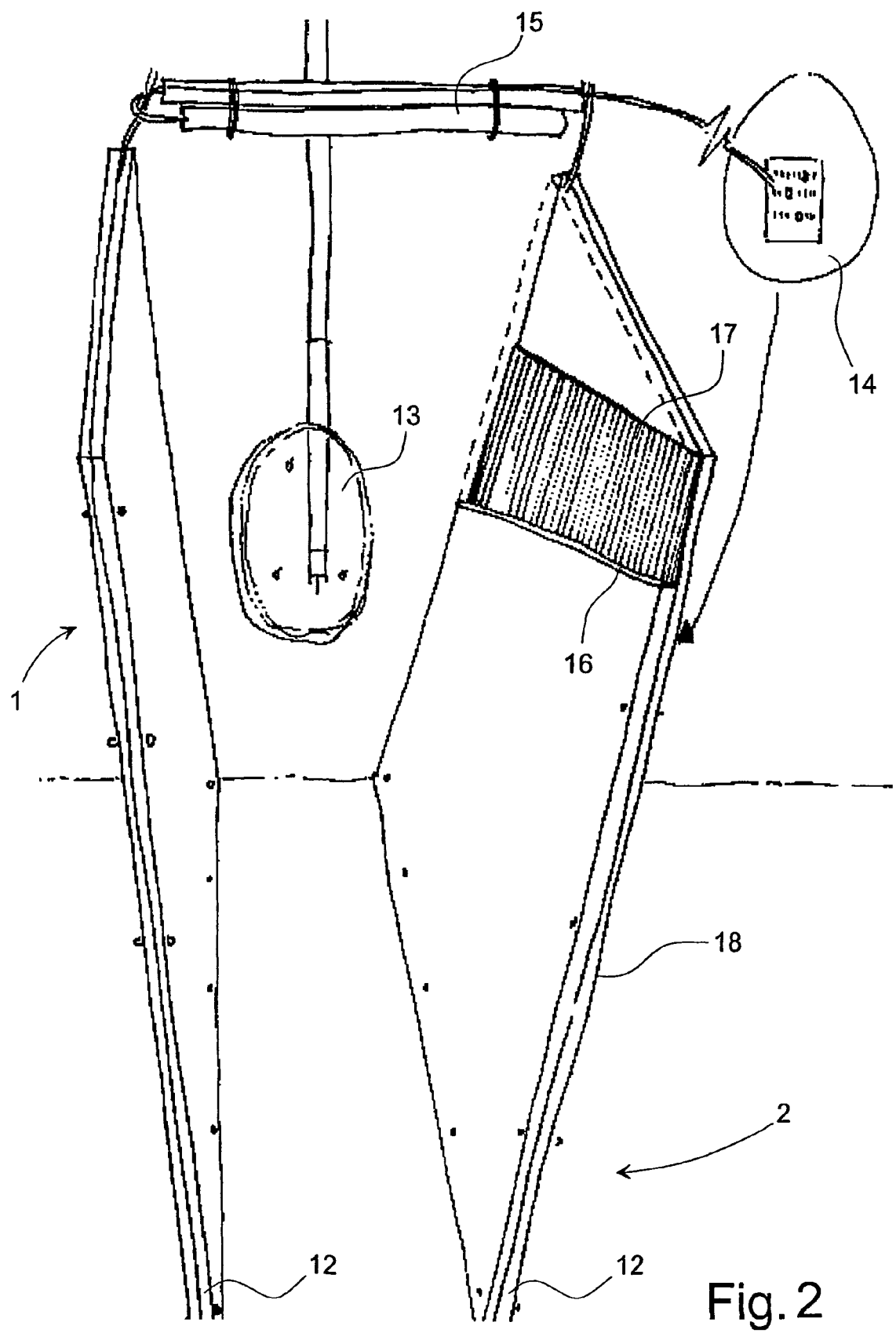
Figure 3:
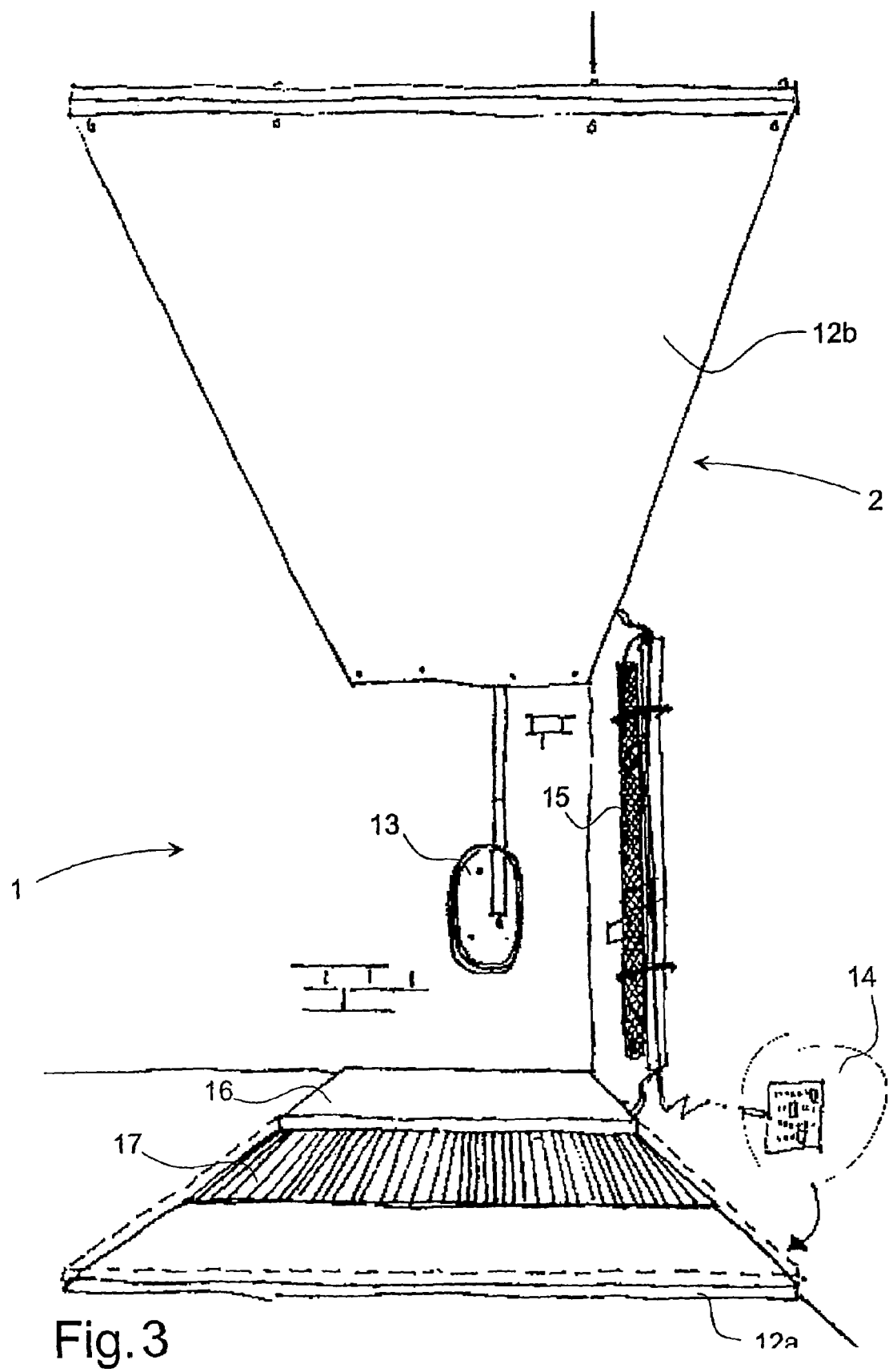

From looking at FIGS. 2 and 3 and the complying description one derives that the electrical circuits shown are either oscillating circuits or simple measuring bridges. The oscillating circuit does not function properly as no frequency variation occur due to the use of only one resistor and one capacitor in the circuit, thus the oscillating circuit only acts as a non-oscillating filter. The simple measuring bridge only measures change in electrolyte volume According to EP-A2-1 091 215 a bioelectric impedance measuring apparatus for humans is described having a number of electrodes. Measurement is only performed, when a barefooted person is positioned on the electrodes, hence being in galvanic contact with the electrodes, as current is sent through the electrodes into the person's body and the impedance is measured and the data is computed into different body constitutions.

It is not possible to imagine an animal standing accurately enough for current to be sent through the feet/legs in order to measure impedance. Furthermore, the apparatus does not measure accurately, when a hoofed animal is positioned on the electrodes, as the hooves function as an electrical isolator. Another disadvantage is that the hooves of any animal, e.g. pig hooves, are dirty and the dirt intervenes with the impedance measurement.

It does not appear from EP-A2-1 091 215 that two sets of electrodes can be arranged opposite each other, instead it appears that the person is in galvanic contact with both sets of electrodes, which allows the apparatus to measure the conductivity and compute the person's weight.

OBJECT OF THE INVENTION

It is therefore the purpose of the present invention to provide an apparatus which is mechanically simple, cleaning friendly, exact and cheap to produce, and which enables performing a frequent registration of either weight or water content of an individual.

According to the present invention, this is achieved with an apparatus of the kind mentioned in the introduction, and where the apparatus includes a measuring cell including at least two electric conducting plates on which is applied a voltage from a power supply, and that the at least two electric conducting plates are disposed with mutually opposite faces and with adjustable spacing, so that an individual or a well-defined part of the individual may be placed between the at least two electric conducting plates, and a measuring unit including means for registering the change in capacity between the at least two electric conducting plates and means for converting the capacity change into a numerical number which is correlated with the weight and/or the water content of the individual.

SUMMARY OF THE INVENTION

In the disclosure below is described how the apparatus according to the present invention is either used for weight determination of a pig or for registration of a water content/weight of a human.

The invention may, however, be used in various other situations, as for example:
  weighing animals at the veterinary,
  weighing wild and/or aggressive animals in e.g. zoological gardens,
  weighing of whole or cut up animals in slaughterhouses,
  weighing individuals that cannot be moved due to old age, injuries or sickness in old people's homes, hospitals or the like.

In the subsequent description concerning the application of the present invention in the agricultural sector, the following expressions are used and are to be understood as:
  Feed grade: As the feed is a mixture of grain, vitamins, minerals and/or drugs, the decisive element is not so much the amount of feed as the feed grade which is dependent on the amount of proteins and energy in the feed.
  Feed unit: A certain amount of feed with a certain feed grade corresponds to one feed unit. Typically, a pig, for example, is to have 2.2 feed units a day immediately before being ready for slaughtering.

If the apparatus is used in the agricultural sector, the measuring cell is adjustable so that the distance and the angle between the two plates can be changed. This enables e.g. preventing several pigs at a time from standing in the measuring cell.

By adjusting the distance and/or the angle between the two plates, the control of the measuring cell is to be calibrated in order to weigh the pig sufficiently exactly. As the dielectric constant of water is known, calibration of the measuring cell may typically be performed with a bottle of water containing a certain amount of water.

Alternatively, the two plates of the measuring cell may be provided so that there are a number of pre-determined setting possibilities for the angle and/or the distance between the plates. This provides for the control of the measuring cell not to be calibrated every time the angle and/or the distance is changed, as the control is pre-programmed with parameters suited for each single setting possible for the angle and/or the distance between the plates.

If the apparatus is used in the health sector, the measuring cell is also adjustable, so that the distance and the angle between the two plates can be changed. This means that the mutual position of the plates can be adapted to e.g. a bed, a chair or the like, in which a human may be situated during the measurement.

In a preferred embodiment of the invention for weighing pigs, the measuring cell is designed with two electric conducting plates having a size of e.g. 800×1000 mm, where, by applying a voltage, typically a high frequency voltage, the measuring cell will act as a capacitor, the capacity of which being dependent on the plate size, the distance between the plates and the dielectricity constant inherent of the material (air or animal) between the plates.

In a second, preferred embodiment of the invention for measuring humans, the measuring cell is designed with two electric conducting plates having a size of e.g. 500×2000 mm, at which a human may be placed, either standing or lying between the plates.

Alternatively, the two electric conducting plates are divided into corresponding fields so that it is not possible to measure e.g. the water content of different areas of the body.

This may be an advantage by certain diseases as e.g. pulmonary oedema, heart diseases or kidney disorders, where specific areas of the human body are to be examined. Furthermore, in many cases an area measurement will mean a more precise diagnosis of the extent of the disease.

It is known that air has a dielectric constant of 1, and water has a dielectric constant of 80. Since humans and animals consist of water to a great extent, one may register the dielectric constant of an animal/human which will be closer to 80 than to 1.

This implies that when an individual is disposed between the two electric conducting plates, a significant and registrable change of the dielectric constant will take place.

Since it is change in capacity in the measuring cell that is registered when an individual is placed between the plates, the air humidity and temperature will have less significance for the measuring result.

In order that an electric field to appear between the at least two electric conducting plates by applying a voltage so that it is possible to measure the change in capacity by placing an individual between the plates, the least two individual plates are made of an electric conducting metal alloy, preferably copper or other metal alloys, as for example aluminium, steel and/or gold.

Alternatively, other materials as e.g. carbon and silicon quartz may be used.

In the agricultural sector it is necessary to get the pig to place itself voluntarily between the two electric conducting plates and to stand still for a sufficiently long time for performing a weighing.

Therefore, in immediate vicinity of the two electric plates there is disposed a dispensing unit, preferably for dispensing water, feed and/or drugs.

Since pigs for slaughtering typically have free access to the feed, it will therefor be possible, when a pig stands between the two plates that on basis of registered weight it will be supplied with either water or feed with a certain feed grade in which possibly drugs may have been added for combating disease.

In the health sector it is easier to get a human to place himself voluntarily between the two electric conducting plates for a sufficient length of time in order to perform a weighing.

Therefore, the supplied water, feed and/or drugs are not used as allurement, but the dispensing unit may otherwise either supply the desired amount of drugs or visually display the amount of drugs calculated on the basis of the performed measurement.

E.g. the dispensing unit may be connected to the patient's IV line so that the exact amount of drugs may be supplied simultaneously with the supply being controlled.

Since the electric conducting plates in the agricultural sector are placed in surroundings where the pigs are, it is necessary to protect the electric conducting plates against various influences from the surroundings, as e.g. knocks from pigs running around in the pigsty and/or corrosion from the aggressive environment.

In the health sector, the electric conducting plates are also to be protected against different actions from the surroundings, as e.g. knocks from beds, wheelchairs or the like.

Therefore, at least one of the at least two electric conducting plates is coated on at least one surface with a electric non-conducting material, preferably plastic.

A plastic coating of the plates of the measuring plate will typically only take place on the faces of the plates facing each other, and the outer side of the plates may e.g. be galvanised or protected in a similar way against the surrounding environment.

A coating and/or galvanisation furthermore imply that the plates of the measuring cell may easily be cleaned.

In the agricultural sector it is a great advantage that they may be cleaned in the same way as any other stable equipment, e.g. with a water hose or a high-pressure cleaner and with chemicals commonly used in connection with stable cleaning and disinfection.

In the health sector it is a requirement that all equipment can be cleaned clinically so that there is no risk of transferring infection from one patient to another patient.

In a preferred embodiment of the invention for the agricultural sector, the two plates of the measuring cell are placed largely upright with mutually facing surfaces so that the pig, when desiring feed or water, may go in between the two plates.

In an alternative embodiment of the invention, the plates of the measuring cell are placed so that the pig go in on one plate while the other plate is hanging above the first plate at an adjustable level.

It may be an advantage by desiring measurement of more individuals at a time, for example when desiring measurement of a whole litter of piglets. Such an embodiment, however, puts demands on the plate on which the pigs are to wall/lie on. It is to be designed of a strong and durable material with a strong and wear-resisting coating.

By furthermore heating the lower plate to the comfort temperature of the piglets, the piglets may even prefer to stay on/in the weighing apparatus.

In a preferred embodiment of the invention for the health sector, the two plates of the measuring cell are disposed largely upright with surfaces facing each other so that e.g. a wheelchair with a patient may be rolled in between the two plates.

In an alternative embodiment of the invention, the plates of the measuring cell are disposed so that one plate is e.g. incorporated in a bed while the other plate is suspended in the ceiling.

This provides the possibility that e.g. on a hospital/old people's home, only one suspended plate is provided, while all beds are equipped with an integrated plate so that the patient is rolled in under the suspended plate when a measurement is to be performed.

In order to register the change in capacity, the means of the measuring unit for registering the change in capacity between the at least two electric conducting plates of the measuring cell are one or more of the following components: measuring bridge and/or potentiometric set-up.

In the preferred embodiment of the invention, a measuring bridge is used, where the use of a measuring bridge provides possibility of even a small change in capacity between the least two electric conducting plates may provide a significant measuring result, as the results of the measuring bridge are based on the vector length and the phase shift between two capacitors in the measuring bridge.

For providing a numerical number correlated with e.g. the weight of a pig, the means of the measuring bridge for converting the signal from the measuring cell includes one or more of the following components: at least one signal amplifier, a voltage rectifier, a filter, a converter, an MCU-unit with a data store and/or display for displaying the numerical number.

In a preferred embodiment of the invention, the inventive means for converting the signal from the measuring cell include the following components:
  an instrumentation amplifier,
  a voltage rectifier
  a low-pass filter
  an amplifier
  an A/D converter, and
  an MCU-unit.

These components are preferably joined in an aggregate unit where the at least two electric conducting plates are connected.

In an embodiment of the invention, means for converting the capacity change to a numerical number are adapted to produce a numerical number which is correlated to the water percentage of the individual or to exact water content relative to the weight of the individual.

In order to provide a numerical number correlated to the individual's water percentage, the apparatus furthermore includes an external weight unit.

In an embodiment of the invention, the weight unit is weight cells that are e.g. connected to one of the electric conducting plates placed in the bottom of a bed, so that the weight of the patient is measured in the same instant as the measuring cell is activated.

Alternatively, the weight unit is an electronic weight on which the individual is to be placed, whereafter signals from the weight is sent to the MCU-unit of the apparatus or directly to a computer that may convert the signals from the MCU-unit of the apparatus and the weight to usable information.

For the farmer to use the apparatus for e.g. optimising the feed consumption in relation to the growth of the pigs, the MCU-unit of the measuring unit is coupled to a computer for collecting the numerical numbers in a data collecting program.

This coupling may be effected via a cable connected to one or more measuring cells, or it may be wireless, as e.g. Blue Tooth technology.

This makes it possible for the farmer e.g. to make statistics over kilo increment per kilo feed and thereby optimise the feed consumption by comparing with previously achieved results or curves over optimal growth of a pig.

It is also possible for the nursing staff in a hospital/old people's home to e.g. make statistics for the water percentage and thereby to follow the development in the disease by comparing previously attained results or curves and thereby to react when unwanted changes occurs.

In a further embodiment of the invention, the measuring unit further includes means for registering/indicating the individual disposed between the at least two electric conducting plates. These means for registering/indication may be:
  an electronic receiver that may catch a signal from e.g. an ear chip,
  an optical or laser reader that may read a bar code or mark, and/or a camera that may recognise the individual between the two plates.

This means that farmer is provided a better tool for optimising the feed consumption as it is possible to indicate weight increment of each pig relative to the amount of feed it has received.

This means that the nursing staff on a hospital/old people's home save time if the new data are automatically stored under the right patient's data folder and may readily be compared with previously registered data, whereby recognition of disease may be ascertained rapidly.

For further optimising the feed consumption, a control program in the computer can be designed so that the computer controls dispensing of water, feed and/or drugs in the dispensing unit on the basis of indication of a single animal and the weight of the animal.

This means that each single pig in the sty can be provided feed with different feed grade and/or extra addition of minerals or vitamins, whereby is achieved an optimal utilisation of feed.

Furthermore, the control program makes it possible to use the daily weighing of a pig as a disease monitoring system, since abnormal weight loss or slow growth may be registered early.

Early in the course of illness, the pig may thus be provided the required medicine in the feed, whereby the amount of medicine possibly can be reduced over time.

The control program implies that the apparatus in the health sector can be used for early recognition of disease.

As the water content in fit individuals is approximately constant, the apparatus may be used for diagnosis of dehydration or accumulation of water, and these data can form parameters in methods for treatment which can be initiated as soon as the measuring data show a deviation by comparing e.g. curves or diagrams of normal conditions.

In an alternative embodiment of the invention, the measuring unit is provided on an add-on board for placing internally of a computer, where one or more measuring cells are replaceably coupled to the add-on board.

This makes it easy to use an apparatus according to the invention since there is to be centrally installed a board including software, after which a measuring cell is connected.

The system is to be extended since there is possibility of connecting more measuring units for an add-on board, so that there is possibility of comparing data from positions without having to move the measuring cell.

In order to measure accurately, the plates are made in such a size that provide space for entirely (absolute measurement) or partly (relative measurement) accommodating a pig standing between the plates of the measuring cell, typically the plates will have a size from 800×1000 mm to 1000×1600 mm. If the apparatus is used for larger or smaller individuals, the plate dimension can be changed.

By measuring the pig's weight and comparing with e.g. an ID number containing information about time of birth or via pre-defined age parameters, the control is to decide whether the case is an absolute measurement or a relative measurement, and thereby register the right weight.

In order to avoid influence on the electric field between the plates by individuals moving around in vicinity of the outer sides of the plates of the measuring cell, one or both plates may be equipped with a screen.

Such a screen may be one of the fixed sides in the sty/room or may be attained by juxtaposing two apparatuses, either in the same sty/room or in two different stys/rooms, where spacing between two juxtaposed electric conducting plates constitutes the screening.

The advantage of using an apparatus according to the invention is:

that the apparatus is a simple mechanical construction and cheap to make;

that the apparatus is mobile and easy to move;

that the apparatus may be incorporated with usual equipment in the agricultural sector, as e.g. stable equipment in new as well as older stables;

that the apparatus may be incorporated with equipment in the health sector, as e.g. beds, wheelchairs or the like; and that the apparatus is cleaning friendly and resistant against aggressive environments.

Weighing and registering the weight of the animals in the growth period enable:

achieving optimisation of the growth as the pig at any time in the growth period is provided the required and right feed mixture containing the needed amount of amino acids, vitamins, minerals and/or drugs;

achieving reduction in the amount of feed used;

achieving reduction in the environmental load with regard to discharge of nitrogen and the like, as the pig by being feed with feed having suitable grade and amount will utilise a greater part of the proteins, vitamins, minerals and/or drugs in the feed;

achieving early recognition of disease and thereby correct dosing of medicine and reduction of drug consumption;

individuals not being stressed during weighing;

achieving better animal welfare for the pigs by they having the right amount of feed with the needed feed grade; and achieving a better payment for the pigs when slaughtered, as the running registration of weight of single individuals implies that the pigs are delivered at the right time where they have the weight corresponding to the greatest price.

Registration of the water content in an individual implies that early disease recognition may be achieved and thereby a right treatment may be started at an early time and possibly reduction of drug consumption may be achieved.

Registration of the water content in an individual may furthermore improve existing methods of treatment. For example, measurement of the water content of a dialysis patient may result in an optimal treatment period in the dialysis apparatus.

SHORT DESCRIPTION OF THE DRAWING

Figure 4:
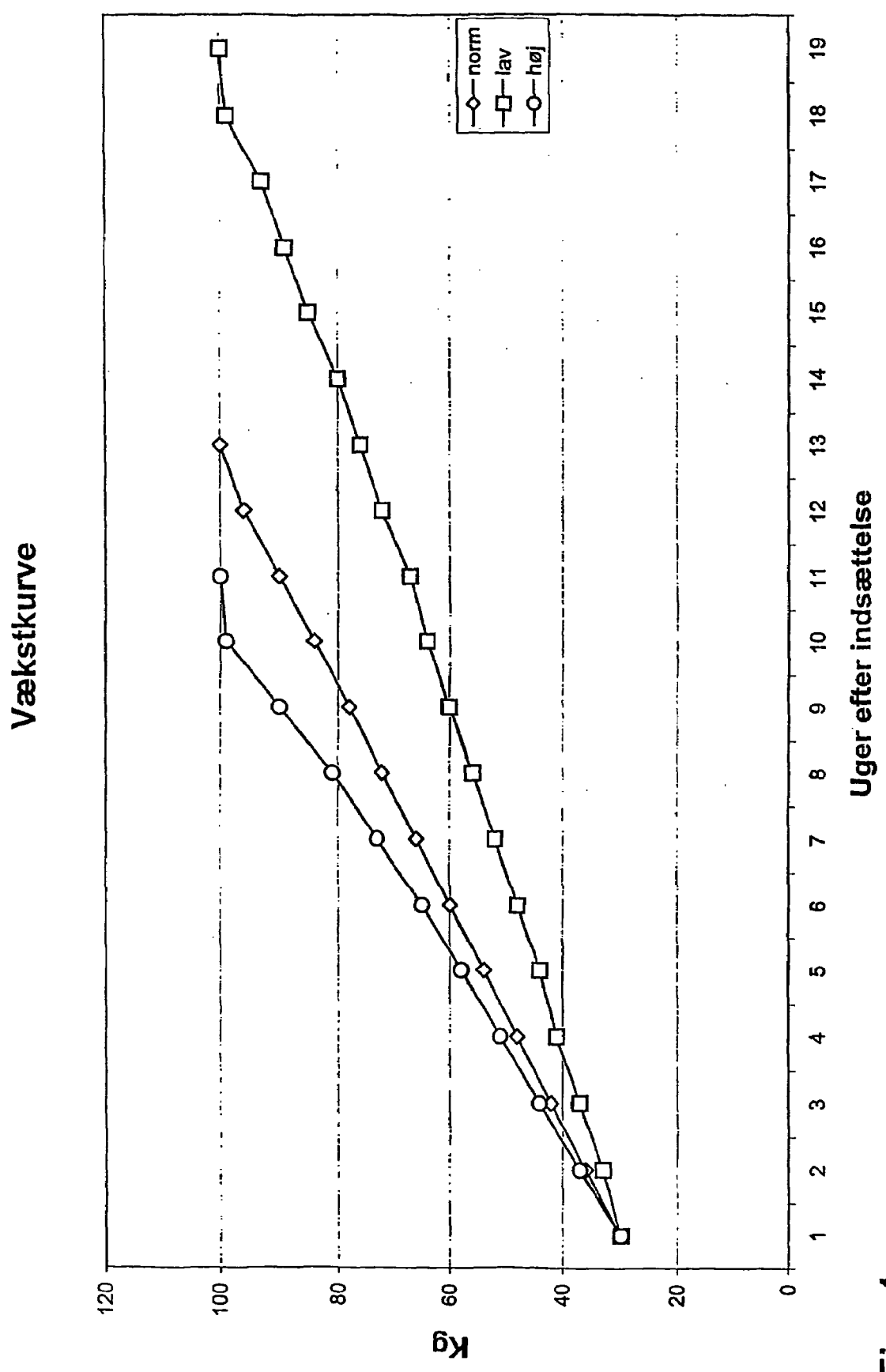

The invention will now be explained in more detail with reference to the accompanying drawing, where FIG. 1 shows a schematic overview of the measuring unit according to the invention, FIG. 2 shows a perspective view of an apparatus according to the invention, FIG. 3 shows a perspective view of an apparatus according to the invention, and FIG. 4 shows three growth curves.

DETAILED DESCRIPTION OF THE INVENTION

The apparatus 1 in FIGS. 1–4 is shown in an embodiment used in the agricultural sector for weighing e.g. pigs going untethered in a pigsty.

FIG. 1 shows a schematic overview of the apparatus 1 that includes a measuring cell 2 and a measuring unit 11.

By weighing a pig the following takes place:

A pig (not shown) walks into the measuring cell 2 between the at least two electric conducting plates 12, and a change of the dielectric constant between the at least two electric conducting plates 12 is induced;

the measuring bridge 3 of the measuring unit 11 registers the change in the dielectricity constant between the at least two electric conducting plates 12;

the instrumentation amplifier 4 amplifies the difference between the input signals from the measuring bridge 3;

the signal from instrumentation amplifier 4 goes through a loss-free voltage rectifier 5 rectifying the signal to a DC voltage which is proportional with the signal from the instrumentation amplifier 4;

the signal from the voltage rectifier 5 goes through a low-pass filter 6 that ensure that the signal is a pure DC voltage;

the signal from the low-pass filter 6 goes through an amplifier 7 enhancing the signal;

the signal from the amplifier 7 goes through an A/D converter 8 changing the signal from an analogous signal to a digital signal;

the signal from the A/D converter 8 goes through an MCU-unit 9 (Micro Controller Unit) that performs calculation of the signal, so that the signal coming from the MCU unit 9 corresponds to a number correlated with the pig's weight.

According to an alternative embodiment of the invention the signal from the measuring bridge 3 goes through an instrumentation amplifier 4 that separates the signal over the two capacitors of the measuring bridge from each other by angle and vector length.

The MCU unit 9 is programmed so that the correlation between the numerical number from the MCU unit 9 and the pig's weight is typically directly proportional. By weighing animals/humans under other circumstances than a stable environment, this correlation may be different.

Experiments will be necessary to find the exact correlations for the numerical number and the unit desired to be weighed.

The numerical number from the MCU unit 9 may be collected by a data collecting program in a connected computer 10 that may process the collected data so that they may be used for statistics, controlling feed dispensing and/or monitoring disease.

Alternatively, the MCU unit may be coupled to an external weight unit (not shown) so that the signal coming from the MCU unit 9 corresponds to a number correlating with water content percentage.

FIG. 2 shows an apparatus 1 with a measuring cell 2 configured as in the preferred embodiment of the invention, where the two electrically conducting plates 12 of the measuring cell 2 are disposed upright with an upwards diverging angle. This angle between the plates 12 contributes to prevent more than one pig from going into the measuring cell 2 at the same time.

The electric conducting plates 12 are designed as rectangular plates that include a copper plate 17 coated with a plastic surface 16 and a typical galvanised rear side 18. At the end of and between the electric conducting plates 12 is disposed a dispensing bowl 13 where the pig can be supplied with feed and/or water.

In an alternative embodiment, the copper plate 17 may be designed so that it has a smaller area than the plate 12 itself.

Typically, the copper plate 17 will then cover the upper part of the plate 12 so that there is not measured in the area around the pig's toes.

The two plates 12 may be connected with a coil 15 which in turn is connected to the control unit 14 placed in immediate vicinity of the measuring cell 2.

The control unit includes a high frequency generator (not shown) and means for transmission of signals (not shown) to the measuring unit (not shown). The measuring unit may be placed centrally or be incorporated in the control unit 14.

FIG. 3 shows an apparatus 1 with a measuring cell 2 configured in an alternative embodiment of the invention, where the two electric conducting plates 12 of the measuring cell are disposed with one plate 12A on the floor and the other plate 12B hanging across the first plate 12A. Such configuration or set-up of the measuring cell 2 enables measuring e.g. an entire batch of piglets, a pig in a situation of rest and/or sick animals.

A way to let the animals settle on the lower plate 12A may be that in connection with this plate 12A, either internally or upon, there is provided a heating mat providing the area to be warm and comfortable for the animals.

FIG. 4 shows three growth curves, where out of the x-axis the pig's age relative to the placing of the pig in a sty, and out of the y-axis is shown the pig's weight. It is to be noted that the three growth curves are provided on the basis of historic data after observing the weight of pigs.

If at an early point in the growth period one knows the tendency for growth of a pig it is possible by means of an enhanced feed grade to move a pig with low growth rate to normal growth rate, or even to high growth rate.

Furthermore, it is possible to attain better growth curves if the pigs' weight is registered on daily basis so that the feed is adjusted to the yield of the pig, whereby these improved growth curves may contribute to further optimisation of raising pigs.

As alternative to the free growth curves shown, the graph may instead show a curve with liquid content per kilo body, or a curve with distribution of liquid in the body, so it is possible to compare data from registration with the apparatus and e.g. show liquid displacements, dehydration or accumulation of water.

The invention claimed is:

1. Apparatus for registering weight and/or water mass of fit and sick individuals, wherein the apparatus includes a measuring cell including at least two electric conducting plates on which is applied a voltage from a power supply, and that the at least two electric conducting plates are disposed with mutually opposite faces and with adjustable spacing, so that an individual or a well-defined part of the individual may be placed between the at least two electric conducting plates, and a measuring unit including means for registering only the change in capacity between the at least two electric conducting plates and means for converting the capacity change into a numerical number which is correlated with the weight and/or the water mass of the individual.

2. Apparatus according to claim 1, wherein the at least two electric conducting plates are provided in a metal alloy.

3. Apparatus according to claim 1, wherein in the immediate vicinity of the at least two electric plates there is disposed a dispenser unit for dispensing water, feed and/or drugs.

4. Apparatus according to claims 1, wherein at least one of the at least two electric conducting plates is coated on at least one surface with an electric non-conducting material.

5. Apparatus according to claim 1, wherein the means of the measuring unit for registering the capacity change between the at least two electric conducting plates of the measuring cell is one or more of the following components: measuring bridge and/or a potentiometric set-up.

6. Apparatus according to claim 1, wherein the means of the measuring unit for converting the signal from the measuring cell includes one or more of the following components: at least one signal amplifier, a voltage rectifier, a filter, a converter, an MCU-unit with a data store and/or a display for displaying the numerical number.

7. Apparatus according to claim 1, wherein the MCU-unit of the measuring unit is coupled to a computer for collecting the numerical numbers in a data collecting program.

8. Apparatus for registering weight and/or water content of fit and sick individuals, wherein the apparatus includes a measuring cell including at least two electric conducting plates on which is applied a voltage from a power supply, and that the at least two electric conducting plates are disposed with mutually opposite faces and with adjustable spacing, so that an individual or a well-defined part of the individual may be placed between the at least two electric conducting plates, and a measuring unit including means for registering the change in capacity between the at least two electric conducting plates and means for converting the capacity change into a numerical number which is correlated with the weight and/or the water content of the individual, and wherein the measuring unit includes means for recognition of the individual disposed between the at least two electric conducting plates.

9. Apparatus for registering weight and/or water content of fit and sick individuals, wherein the apparatus includes a measuring cell including at least two electric conducting plates on which is applied a voltage from a power supply, and that the at least two electric conducting plates are disposed with mutually opposite faces and with adjustable spacing, so that an individual or a well-defined part of the individual may be placed between the at least two electric conducting plates, and a measuring unit including means for registering the change in capacity between the at least two electric conducting plates and means for converting the capacity change into a numerical number which is correlated with the weight and/or the water content of the individual, and in the immediate vicinity of the at least two electric plates there is disposed a dispenser unit for dispensing water, feed and/or drugs, and wherein a computer controls dispensing of water, feed and/or drugs in the dispensing unit on the basis of indication of a single individual and the registered weight.

10. Apparatus according to claim 1, wherein the measuring unit is provided on an add-on board for internal disposition in a computer, where one or more measuring units are replaceably coupled to the add-on board.

11. Apparatus according to claim 1, wherein the apparatus furthermore includes an external weight unit.

* * * * *